US00RE36677E

United States Patent [19]

Reuben

[11] E Patent Number: Re. 36,677

[45] Reissued Date of Patent: May 2, 2000

[54] METHOD OF MAKING A FLOOR MAT HAVING A CHANNEL

[75] Inventor: Harold Reuben, Akron, Ohio

[73] Assignee: Collins & Aikman Accessory Mats, Inc., Canton, Ohio

[21] Appl. No.: 09/163,995

[22] Filed: Sep. 30, 1998

Related U.S. Patent Documents

Reissue of:

[64] Patent No.: 5,620,546
Issued: Apr. 15, 1997
Appl. No.: 08/248,522
Filed: May 24, 1994

U.S. Applications:

[60] Division of application No. 07/872,456, Apr. 23, 1992, Pat. No. 5,362,544, which is a continuation-in-part of application No. 07/694,966, May 3, 1991, Pat. No. 5,154,961.

[51] Int. Cl.[7] ..... B29C 43/20; B29C 59/02; B32B 3/02; B32B 33/00

[52] U.S. Cl. ..... 156/219; 156/72; 264/243; 264/293; 264/294; 264/319; 428/82; 428/83; 428/88; 428/89; 428/95

[58] Field of Search ..... 264/243, 259, 264/263, 266, 267, 274, 279, 293, 294, 319; 156/196, 219, 72, 160, 163; 428/82, 83, 88, 89, 95

[56] References Cited

U.S. PATENT DOCUMENTS

| | | | |
|---|---|---|---|
| D. 194,347 | 1/1963 | Gerber | D9/6 |
| D. 200,295 | 2/1965 | Lea | D9/6 |
| D. 313,789 | 1/1991 | Thundercloud | D12/203 |
| 1,935,302 | 11/1933 | Waite | 2/278 |
| 2,296,502 | 9/1942 | Cotterman . | |
| 2,939,179 | 6/1960 | Penman et al. | 264/243 |
| 3,014,829 | 12/1961 | Curtin | 154/49 |
| 3,703,424 | 11/1972 | Charnock et al. | 156/272 |
| 3,804,699 | 4/1974 | Johnson | 161/39 |
| 3,821,065 | 6/1974 | Copeland et al. | 161/67 |
| 3,953,631 | 4/1976 | Gordon | 264/243 |
| 4,143,194 | 3/1979 | Wihksne | 428/81 |

(List continued on next page.)

FOREIGN PATENT DOCUMENTS

| | | |
|---|---|---|
| 0 259 795 A2 | 9/1987 | European Pat. Off. . |
| 0259795 | 9/1987 | European Pat. Off. . |
| 0 351 041 A2 | 1/1990 | European Pat. Off. . |
| 0351041 | 1/1990 | European Pat. Off. . |
| 26 19 361 | 4/1976 | Germany . |
| 59-14813 | 1/1984 | Japan . |
| 223909 | 9/1989 | Japan . |
| 1 325 203 | 8/1973 | United Kingdom . |
| 2 171 901 | 3/1985 | United Kingdom . |
| WO 86/06691 | 11/1986 | WIPO . |

OTHER PUBLICATIONS

"Presentation of Publications and Others", Japanese Patent Application No. 4–112,833 w/out attachments, dated Apr. 12, 1999.

English Translation of "Presentation of Publications and Others", Japanese Patent Application No. 4–112,833, dated Apr. 12, 1999.

Communication including European Search Report (for EP 92 40 1240), dtd. Aug. 3, 1993; Examiner: L. Vistisen.

(List continued on next page.)

*Primary Examiner*—Angela Ortiz
*Attorney, Agent, or Firm*—Myers Bigel Sibley & Sajovec

[57] ABSTRACT

The floor mat of the present process is a pliable multilayer structure having an upper face layer and a base layer. The base layer has a main body section bordered by an edge section. Preferably, the main body section is relatively thin and the edge section is relatively thick. A surface of the base layer is adapted to confront flooring overlaid by the mat. The edge section has a channel extending longitudinally thereof, and preferably opening from the bottom surface of the edge section. A portion of the main body section can have a channel molded therein such that a portion of the main body section is disposed above the remainder of the main body section to provide a decorative and aesthetically pleasing design in the main body section.

33 Claims, 3 Drawing Sheets

U.S. PATENT DOCUMENTS

| | | | |
|---|---|---|---|
| 4,174,991 | 11/1979 | Reuben | 156/242 |
| 4,230,755 | 10/1980 | Morris | 423/95 |
| 4,361,614 | 11/1982 | Moffitt, Jr. | 428/138 |
| 4,382,986 | 5/1983 | Reuben | 428/88 |
| 4,399,176 | 8/1983 | Bell et al. | 428/85 |
| 4,465,720 | 8/1984 | Bell et al. | 428/85 |
| 4,529,639 | 7/1985 | Peoples, Jr. et al. | 428/95 |
| 4,579,764 | 4/1986 | Peoples, Jr. et al. | 428/95 |
| 4,609,580 | 9/1986 | Rockett et al. | 428/297 |
| 4,673,603 | 6/1987 | Roth | 428/85 |
| 4,721,641 | 1/1988 | Bailey | 428/88 |
| 4,733,997 | 3/1988 | Ford et al. | 264/138 |
| 4,748,063 | 5/1988 | Reuben | 428/78 |
| 4,749,602 | 6/1988 | Russell | 428/99 |
| 4,751,764 | 6/1988 | Reuben | 16/8 |
| 4,758,457 | 7/1988 | Altus | 428/82 |
| 4,828,898 | 5/1989 | Bailey | 428/88 |
| 4,835,030 | 5/1989 | Squier et al. | 428/88 |
| 4,938,677 | 7/1990 | Robbins, III | 264/151 |
| 4,973,505 | 11/1990 | Bielous | 428/44 |
| 5,071,614 | 12/1991 | Grace | 264/243 |
| 5,128,189 | 7/1992 | Bartlett | 428/71 |
| 5,154,961 | 10/1992 | Reuben . | |
| 5,171,619 | 12/1992 | Reuben | 156/72 |

OTHER PUBLICATIONS

Communication Pursuant to Article 96(2) and Rule 51(2) EPC re Application No. 92401240.4–2303, dtd. Jun. 9, 1995; Examiner: B. Novelli.

Observations and Answer to Official Action, re: EPO Application No. 92 401 240.4, dtd. Oct. 5, 1995; from A. Hurwic et al.

Communication Pursuant to Article 96(2) and Rule 51(2) EPC re Application No. 92401240.4–2303, dtd. May 28, 1996; Examiner: B. Novelli.

Observations and Answer to the Official Action, re: EPO Application No. 92 401 240.4, dtd. Nov. 13, 1996; from A Hurwic et al.

Communication Pursuant to Article 96(2) and Rule 51(2) EPC re Application No. 92401240.4–2303, dtd. Feb. 13, 1997; Examiner: B. Novelli.

Observations and Answer to the Official Action, re: EPO Application No. 92 401 240.4, dtd. May 21, 1997; from A Hurwic et al.

"Submission of Additional Prior Art" with Appendices and including letter of B. Cronin, dtd. Jul. 15, 1997; re: Application No. 92401240.4

Communication Pursuant to Article 96(2) and Rule 51(2) EPC re Application No. 92401240.4–2303, dtd. Dec. 2, 1997; Examiner: B. Novelli.

Answer to the Official Action, re: EPO Application No. 92 401 240.4, dtd. Mar. 27, 1998; from A Hurwic et al.

"Observations Based on Further Submission of Prior Art" with Appendices and letter of B. Cronin, dtd. May 15, 1998, re: EPO Application No. EP 92401240.4.

J.C. Whitney Catalog No. 515J, p. 96, MAT No. 1 of 4 Piece Carpet Mat Set. Bottom Center of Page.

J.C. Whitney Catalog No. 515T, p. 97, Plush Carpet Mat No. 1, Lower Left Center of Page and Customer–tailored Carpet Mat No. 3. Left Center of Page.

Memo from Kathy Au to Mr. Ernie De La Motte dated Jan. 23, 1993.

Letter from Thomas M. Berry to Mr. James Lockwood dated Dec. 15, 1997.

Letter from Ronald J. Snyder to F. Michael Sajovec dated Dec. 20, 1996 (including 6 sheets of color photographs).

Untitled photographs of rubber mat (6 sheets, 11 photographs, labeled with reference No. 49), date unknown.

METHOD OF MAKING A FLOOR MAT HAVING A CHANNEL

Matter enclosed in heavy brackets [ ] appears in the original patent but forms no part of this reissue specification; matter printed in italics indicates the additions made by reissue.

RELATED APPLICATION

This application is a Divisional of application Ser. No. 07/872,456, filed 23 Apr. 1992, now U.S. Pat. No. 5,362, 544, which is a Continuation-in-Part of Ser. No. [027]*07/* 694,966 filed May 3, 1991 now U.S. Pat. No. 5,154,961 the disclosures of which are incorporated herein by reference.

BACKGROUND OF THE INVENTION

This invention relates to floor mats such as those used in the passenger compartments of automobiles or as entry mat in homes or workplaces.

Floor mats of this type found in automobiles or homes generally are made of a combination of an elastomeric material (e.g., rubber) and a carpeted material. Typically the carpeted material is attached to a rubber backing layer by any of various methods. Unfortunately the layers of these mats tend to separate at the edges of the mat when the mat is in use.

Various methods have been used to provide additional strength to the attachment between layers of the mat to prevent the separation of the mats layers at the edge. For example, methods include surging yarn over the edges of the mat or a tape may be placed covering the edge of the mat and then stitched to the mat. A disadvantage of these methods is that the stitching holding the edging tape to the mat also tends to wear out with use and the tape separates from the mat. Furthermore, the tape and stitching must be added to the mat after the mat has been molded, thereby adding an additional manufacturing step.

Another problem is that the mats have a tendency to move or shift due to the action of feet on the mat. Various efforts have been made to prevent slippage by use of permanent retention means such as hooks, snap fasteners, Velcro® strips and the like. However, none of these are commercially successful because they tend to distract from the aesthetics of the mat. Another solution, particularly for mats used in automobiles, is to use an array of downwardly extending projections or "nibs" to reduce slippage such as proposed, for example in commonly assigned U.S. Pat. No. 4,174,991 to Reuben. An alternative solution is to use a tacky adhesive on the undersurface of the mat such as proposed in U.S. Pat. No. 4,609,850 to Rockett et al. A combination of nibs and tacky adhesive has also been proposed in commonly assigned U.S. Ser. No. 07/642,926 filed Jan. 18, 1991, and a combination of nibs and polyurethane foam has been proposed in commonly assigned U.S. Ser. No. 07/687,234 filed Apr. 18, 1991.

It would be highly desirable to provide a floor mat which does not have the need for edge stitching, taping, or the like while eliminating the slippage problems associated with conventional floor mats.

SUMMARY OF THE INVENTION

The floor mat of the present invention is a pliable multilayer structure having an upper face layer and a base layer adapted to confront flooring overlaid by the mat. The base layer has a main body section bordered by an edge section.

Preferably, the main body section is relatively thin and the edge section is relatively thick. The edge section has a channel extending longitudinally thereof, and preferably opening from the bottom surface of the edge section. The edge section has an upper surface disposed at an elevation above the elevation of the main body section of the base layer. This upper surface preferably provides a decorative edge portion in the face layer. The thicker edge section provides stiffness to the periphery of the base layer and serves to reduce deformation of the channel of the mat during use. Additionally, the thicker section helps prevent slippage of the mat. The channel of the floor mat preferably has a plurality of ribs disposed within and extending transversely across the channel to further stiffen the channel. A portion of the main body section can also have a channel molded therein, and preferably opening from the bottom surface of the main body section of the base layer. This portion of the main body section is disposed at an elevation above the elevation of the remainder of the main body section. This raised portion provides a decorative and aesthetically pleasing design in the main body section.

The floor mat, and preferably does, include anchoring means to assist in preventing slippage. For example, the floor mat can include a plurality of nibs extending downward from the bottom surface of the base layer, an adhesive layer on the bottom surface of the base layer, a layer of polyurethane foam having a high coefficient of friction, or any combination thereof.

The present invention further encompasses a method of producing a floor mat having the above pliable multilayer structure. The method includes contacting the top surface of the base layer to the bottom surface of the upper face layer and placing the layers under a compressive molding pressure applied to the bottom surface of the base layer and the top surface of the base layer. A channel is molded in, and preferably opens from, the edge section of the base layer while the base layer and the upper face layer are under compressive molding pressure. A portion of the bottom surface of the face layer is embedded in the top surface of the upper face layer. The base layer is heated while it and the face layer are under the compressive molding pressure to join the layers together and to cure the base layer.

DESCRIPTION OF THE DRAWINGS

Other features of the invention will be apparent from the following description of illustrative embodiments thereof, which should be read in conjunction with the accompanying drawings, in which.

DESCRIPTION OF THE PREFERRED EMBODIMENT

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

Figure 4:
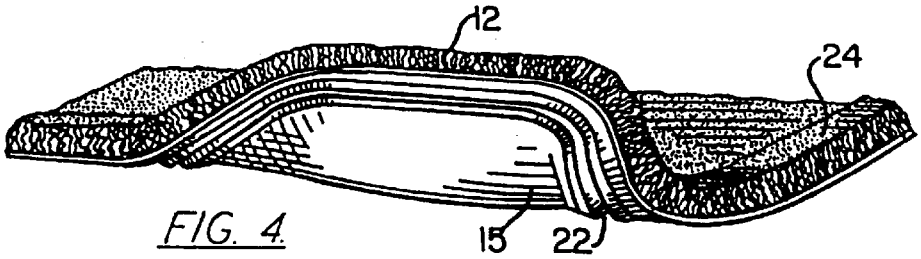
FIG. 4 is a perspective view of the mat illustrating the pliable nature of the mat.

Referring now more particularly to the drawings, the pliable multilayer floor mat of the present invention is indicated generally by the numeral 10. The term "pliable" relates to the mat being easily folded or flexed and is illustrated in FIG. 4. For example, a floor mat held at arm's length which is unable to support its own weight would be pliable or a mat which can be rolled up would be pliable. The floor mat includes an upper face layer 12 overlying a base layer 15 the base layer 15 having an upper surface 17 and a bottom surface 19. The bottom surface 19 is adapted to confront flooring overlaid by the mat. The base layer 15 further includes a relatively thin main body section 20 bordered by a relatively thick edge section 21 as compared to each other. The edge section 21 of the base layer 15 has a channel 22 extending longitudinally thereof, and preferably opens from the bottom surface 19 of the base layer 15.

The upper face layer 12 preferably is formed from carpet material which is wear-resistant and has a pleasing appearance. It will be apparent to one skilled in the art that the face layer can be an elastomer layer 12a (FIG. 9), a thermoplastic layer, such as a vinyl compound, or a non-woven layer. The carpet material may be tufted, woven, needle punched or the like, and may be backed or unbacked. Preferably, the carpet material is a tufted pile carpet construction, i.e., a plurality of pile yarns extend through a primary backing to form loops which are cut to form tufts. The fibers of the pile yarns can be composed of natural or synthetic fibers and may be thermoplastic or thermosetting. The carpet fibers employed in the present invention are described in U.S. Pat. No. 4,174,991 to Reuben, the disclosure of which is incorporated herein by reference as if set out fully, and include polyamide fibers such as nylon fibers, particularly nylon 6 and nylon 66, polyester fibers, acrylic fibers, polypropylene and blends and copolymers thereof.

The base layer 15 is preferably formed of a heat curable elastomeric material or a thermoplastic material. Exemplary heat curable elastomeric materials include vulcanizable elastomers which are cured by a sulfur reaction mechanism or a metallic oxide mechanism. Particularly suitable elastomeric materials are rubbers such as natural rubber, butadiene polymers and copolymers such as styrene-butadiene rubbers and polybutadiene rubbers, isoprene polymers and copolymers, chloroprene rubbers such as neoprene, nitrile rubbers, butyl rubbers, and ethylene-propylene rubbers, and blends and copolymers thereof. Styrene-butadiene rubbers are particularly preferred for use in the present invention. Suitable thermoplastic materials include polyvinyl chloride, polyethylene, ethylene vinyl acetate, polypropylene, polystyrene, and thermoplastic rubber.

Figure 1:
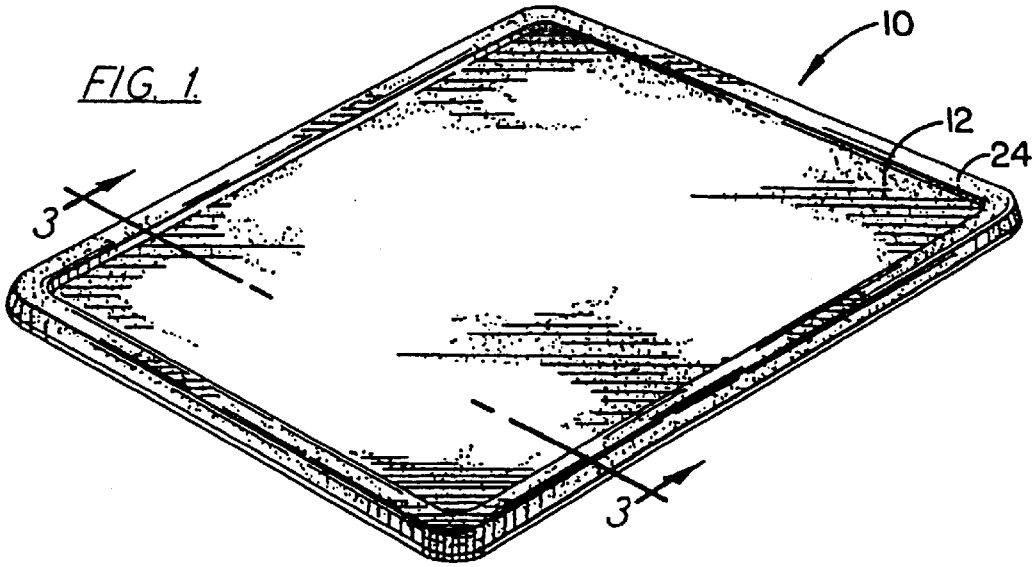
FIG. 1 is a top perspective view of a floor mat in accordance with the invention.
Figure 2:
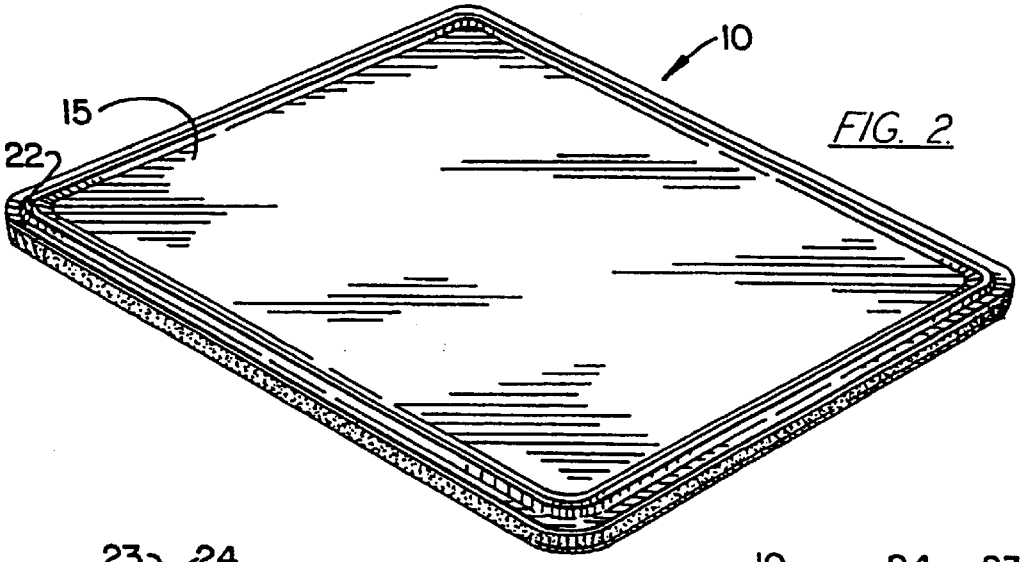
FIG. 2 is a bottom perspective view of the mat.
Figure 3:
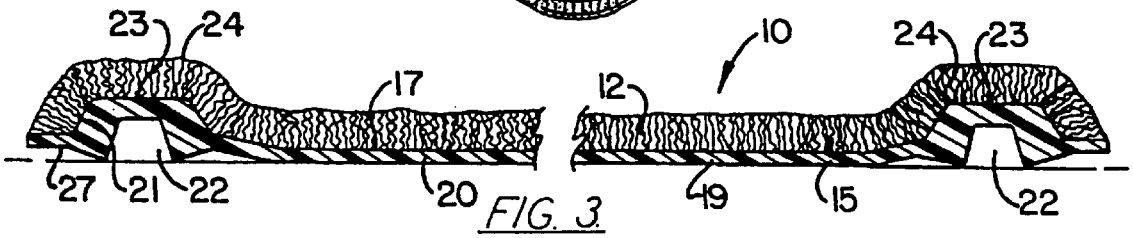
FIG. 3 is an enlarged fragmentary sectional view taken substantially along the line and in the direction of the arrows 3—3 of FIG. 1.

As shown in FIGS. 1–3, the channel 22 circumscribes the periphery of the floor mat 10. The upper surface 23 of edge section 21 is disposed at an elevation above the elevation of the main body section 20. Preferably, this elevated upper surface 23 of the base layer 15 provides a decorative and aesthetically pleasing edge portion 24 to the face layer 12 of the floor mat 10, and eliminates the need for stitching or binding of the edge of the mat. The elevated upper surface 23 of edge section 21 reduces the tendency of the uppermost face layer 12 to separate from the base layer 15. The decorative edge portion 24 of the face layer 12 is preferably about ¼ inches high, but heights from about ⅛ to about ½ inches may be used.

As illustrated in FIG. 3, the channel 22 is formed in and preferably opens from the bottom surface 19 of the base layer 15. Preferably, the channel 22 assists in creating the thicker edge section 21 of the base layer 15. As described below, a thicker edge section 21 of the floor mat may optionally result from the redistribution of base layer material during the molding, particularly compression molding of the floor mat. This thicker edge section 21 also prevents the mat 10 from slipping during use.

Figure 5:
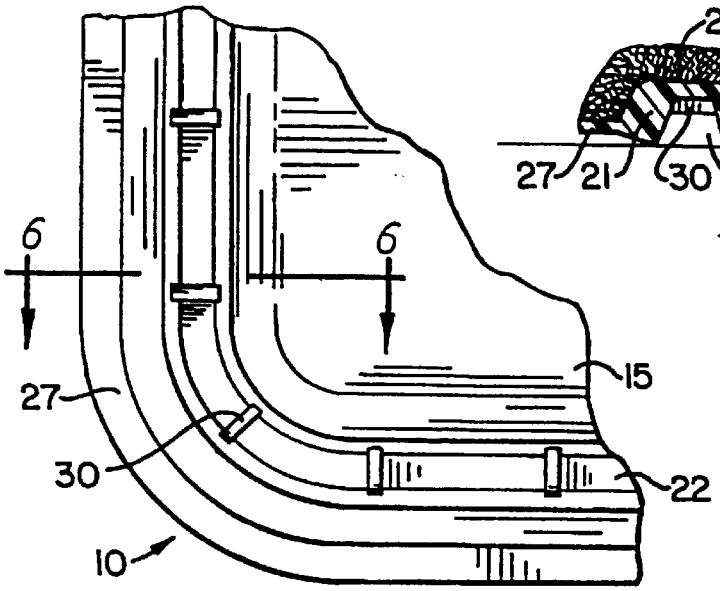
FIG. 5 is a fragmentary bottom plan view of an alternative embodiment of a floor mat in accordance with the present invention.
Figure 6:
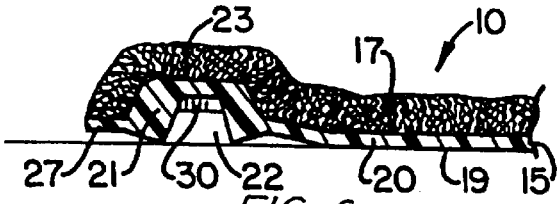
FIG. 6 is an enlarged fragmentary sectional view taken substantially along the line and in the direction of the arrows 6—6 of FIG. 5.
Figure 7:
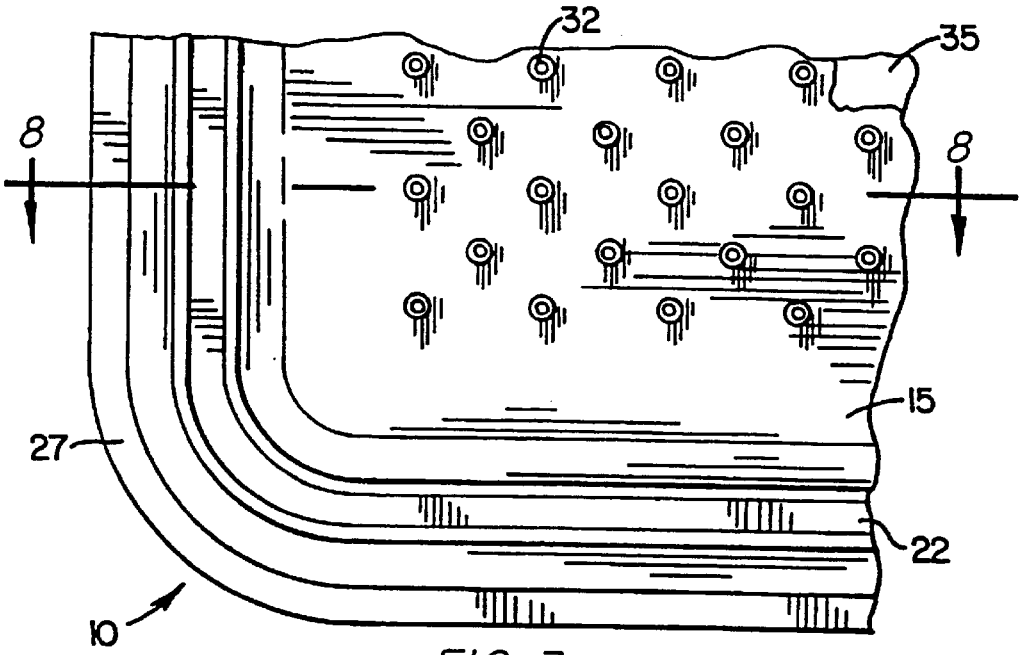
FIG. 7 is a fragmentary bottom plan view of a floor mat in accordance with the present invention.
Figure 8:
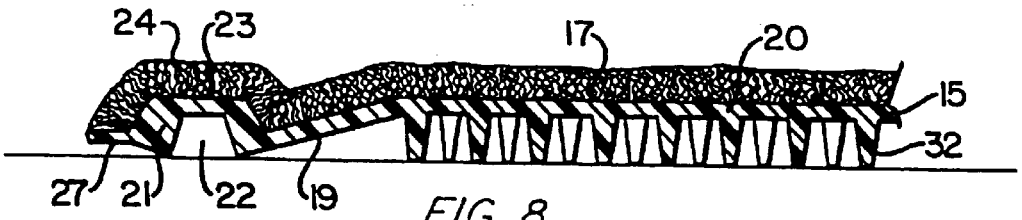
FIG. 8 is a fragmentary sectional view taken substantially along the line and in the direction of the arrows 8—8 of FIG. 7.
Figure 9:
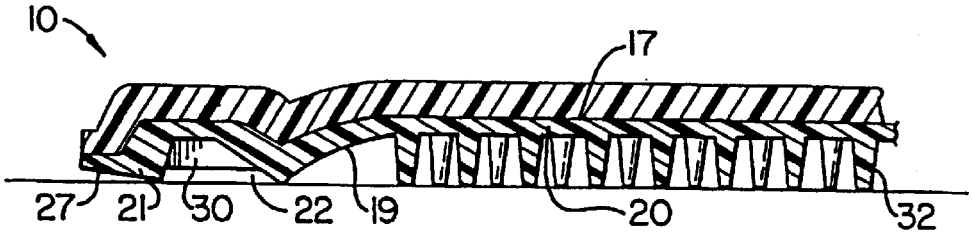
FIG. 9 is a fragmentary sectional view illustrating another embodiment of the invention.

The shape of the channel 22 is shown as substantially rectangular in FIGS. 1–8 and as a tapered channel in FIG. 9, but may be of other shapes such as V-shaped or U-shaped or semicircular. The channel 20 is preferably about ¼ inches wide and about ¼ inches deep, however, suitable dimensions for the channel are typically from about ⅛ to about ½ inches wide and from about ⅛ to about ½ inches deep. When in use, the bottom surfaces of the main body portion 20 and the edge section 21 of the base layer 15 are, as shown in FIGS. 3 and 6, substantially coplanar. The bottom surface 19 of the base layer 15 which extends outward from the channel 22 to the edge of the floor mat 10 and the bottom surface 15 of the base layer 15 which extends inward from the channel 20 both are closely adjacent and preferably underlying surface of the flooring.

As shown in FIGS. 3, 6, 8, and 9 the present invention may optionally have a step portion 27 extending from the outer edge of the thicker edge section 21 of the base layer 15. The width of the step portion 27 is preferably less than one inch and more preferably greater than 1/16 inch. The step portion 27 of the floor mat extends outward from the edge section 21 to the edge of the floor mat 10, and during use the bottom surface of the step portion 27 is substantially coplanar with the portion of the bottom surface 19 of the base layer 15. The step portion 27 adds area for bonding of the face layer 12 to the base layer 15 thereby increasing the strength of the bond between the layers and increasing the resistance to separation. Furthermore, the step portion 27 provides a smooth edge to the floor mat 10 without the use of binding materials by allowing for the return from the edge section 21 of the base layer 15 to the normal thickness of the base layer 15 and thereby exposing a limited portion of the base layer 15 to view.

In an alternative embodiment of the present invention, as shown in FIGS. 5, 6 and 9, rib members 30 are disposed in and extend transversely across the channel 22, strengthen the channel 22 and prevent distortion of its shape. The rib members 30 assist in reducing the tendency of the channel 22 of compressing or spreading add causing the edges of the mat 3O to elevate above the surface upon which the mat is placed. The elevation of the edges of the mat 10 above the surface upon which the mat is placed increases the possibility of wear, can present an impediment to ingress and egress of a vehicle or dwelling and can contribute to mat slippage during use. The rib members 30 are shown as spaced approximately one inch apart however, spacings from about ½ to about 2 inches may be used.

As shown in FIGS. 7, 8, and 9, the floor mat 10 preferably includes a plurality of nib elements 32 and/or other anti-slippage anchoring means such as the material 35 shown in FIG. 7. The nib elements illustratively and preferably are of frusto-conical shape and are connected to the lower surface of base layer 15. The nib elements 32 extend substantially vertically downward from the base layer 15 and when provided through the material 35 upon the bottom surface of the base layer 15. The material 35 may be a tacky pressure-sensitive adhesive material as described in U.S. application Ser. No. 07/642,926 filed Jan. 18, 1991, or polyurethane foam as described in U.S. application Ser. No. 07/687,234 filed Apr. 18, 1991, the disclosures of which are incorporated herein by reference as if set out fully.

Figure 10:
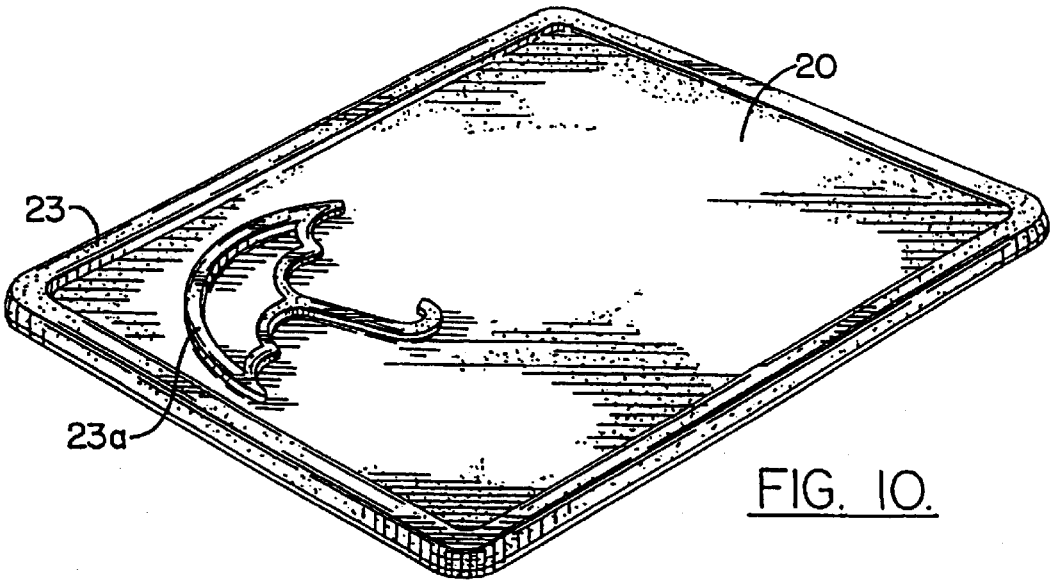
FIG. 10 is a top perspective view of a household floor mat in accordance with the invention.
Figure 11:
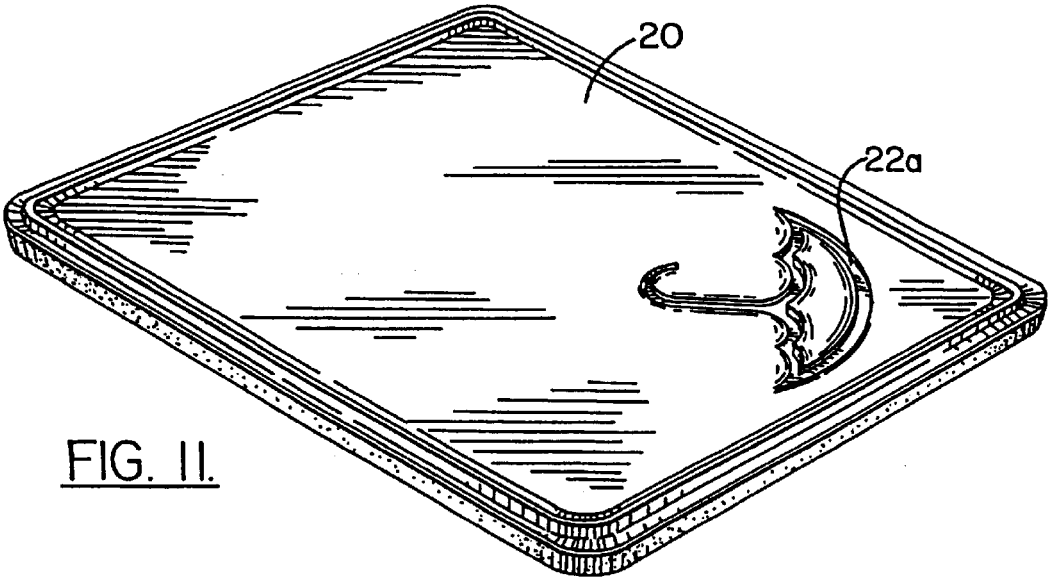
FIG. 11 is a bottom perspective view of the floor mat shown in FIG. 10.

As shown in FIGS. 10 and 11, the main body section 20 of the floor mat 10 can also have a channel 22a formed in a portion thereof, and preferably opening from a bottom surface 19a of the main body section The upper surface 23a of the portion of the main body section 20 having the channel 22a is disposed at an elevation above the elevation of the remainder of the main body section 20 and is substantially the same elevation as the upper surface 23 of edge section Preferably, this elevated upper surface 23a of the main body section 20 provides a decorative and aesthetically pleasing design in the main body section 20, for example, the umbrella shown in FIGS. 10 and 11 or indicia of an automobile manufacturer. While a raised portion in the main body of the floor mat has been described, other methods of producing such indicia or design in the main body of the floor mat may be utilized. Examples of other methods which could be used include, but is not limited to, embroidery or other stitching means, variations in color or texture of the face layer material or by impressing into the upper surface or face layer the design or logo.

The method of the present invention includes contacting the upper or top surface 17 of a base layer 15 to the bottom surface of the upper face layer 12 followed by placing the base layer 15 and face layer 12 under compressive molding pressure, (e.g., a pressure selected from the range of 50 psi to about 250 psi). Preferably, if a tufted pile tufted carpet is the upper face layer 12, the pile is crushed while the face layer 12 and the base layer 15 are under the compressive molding pressure. A channel 22 or channel 22a is molded in, and preferably opens from the bottom surface 19 of the base layer 15 or the bottom surface 19a of the main body portion 20 while the upper face layer 12 and base layer 15 are under compressive molding pressure. A portion of the bottom surface of the face layer 12 becomes embedded in the base layer during heating and curing of the base layer 15 at a temperature of from about 250° F. to about 400° C. while the carpet and base layer are under the compressive molding pressure. The face layer of the multilayered mat 10 is cooled to a temperature of less than 100° F. to maintain the fibers of the carpet yarns below a temperature at which the pile become substantially permanently deformed under the applied molding pressure and so as to maintain the resiliency of the face layer 12 upon release of the molding pressure. The cooling is conducted simultaneously while the face layer 12 and base layer 15 are under pressure. The heating of the base layer 15 is maintained until the elastomeric material or the thermoplastic material of the base layer are cured. A suitable molding apparatus is described more fully in U.S. Pat. No. 4,174,991, although other molding techniques, particularly if thermoplastic materials are used, will be apparent to one skilled in the art.

A sufficient compressive molding pressure must be employed in the present invention to achieve a bond between the bottom surface of the face layer 12 and the upper surface 17 of the base layer 15. Sufficient compressive molding pressure is also required to mold the base layer material into the recess in the mold cavity. Thus, for example, sufficient molding pressure must be employed in order to embed the loops of a tufted pile carpet face layer 12 into the base layer 15 and also to insure that the elastomeric base layer 15 is formed into the desired channel 22. Furthermore, sufficient pressure may be required to cause the flow of the base layer material when forming the channel 22 and to form the relatively thick edge section 21 adjacent the periphery of the floor mat 10.

It will be appreciated that a mat in accordance with the present invention can be used upon various flooring having carpeted areas or hard surface areas or both types of areas, such as in automobiles and in households. Additionally, the mat will have a longer useful life and can be used more successfully under wet or dirty conditions than a mat having only conventional anchoring means.

While a preferred embodiment of the invention has been shown and described, this was for purposes of illustration only, and not for purposes of limitation, the scope of the invention being in accordance with the following claims.

That which is claimed is:

1. A method of forming an integral raised portion in an edge section of a floor mat; said floor mat having a pliable multilayer structure having an upper *carpet* face layer overlying a base layer, and having a main body section bordered by said edge section;

molding an integrally molded channel in the edge section and extending longitudinally thereof by placing the base layer and the face layer under a compressive molding pressure applied to a bottom surface of the base layer and the top surface of the *carpet* face layer;

embedding a portion of the bottom surface of the *carpet* face layer in the upper surface of the base layer *such that a pile of the carpet face layer has a substantially uniform height above the upper surface of the base layer across the main body section*;

heating the base layer to cure the base layer while the face layer and the base layer are under the compressive molding pressure; and maintaining the heating of the base layer until the base layer is cured, so as to form an integral raised portion in the edge section of the floor mat, defined by said integrally molded channel*;*

*wherein said embedding step further comprises embedding a portion of the bottom surface of the carpet face layer in the upper surface of the base layer such that the pile of the carpet face layer has a substantially uniform height above the upper surface of the base layer across both the main body section and the edge section.*

2. A method according to claim 1 where the face layer is comprised of tufted pile carpeting, said process further comprising the step of crushing the carpet pile while the base layer and the face layer are under compressive molding pressure.

3. A method according to claim 1 where the face layer is comprised of tufted pile carpeting, said process further comprising the step of cooling the face layer to maintain the pile carpeting of the face layer below a temperature at which the carpet pile becomes substantially permanently deformed under the applied molding pressure so as to maintain the resiliency of the carpet pile upon release of the compressive molding pressure, the cooling being conducted simultaneously while the face layer and the base layer are under pressure.

4. A method according to claim 3 further comprising the step of crushing the carpet pile carpeting while the base layer and the face layer are under compressive molding pressure.

5. [A method according to claim 1] *A method of forming an integral raised portion in an edge section of a floor mat; said floor mat having a pliable multilayer structure having an upper carpet face layer overlying a base layer, and having a main body section bordered by said edge section;*

*molding an integrally molded channel in the edge section and extending longitudinally thereof by placing the base layer and the face layer under a compressive molding pressure applied to a bottom surface of the base layer and the top surface of the carpet face layer;*

*embedding a portion of the bottom surface of the carpet face layer in the upper surface of the base layer such that a pile of the carpet face layer has a substantially uniform height above the upper surface of the base layer across the main body section;*

*heating the base layer to cure the base layer while the face layer and the base layer are under the compressive molding pressure; and*

*maintaining the heating of the base layer until the base layer is cured, so as to form an integral raised portion in the edge section of the floor mat, defined by said integrally molded channel;* wherein said molding step further comprises molding rib members disposed within and extending transversely across the channel.

6. [A method according to claim 1] *A method of forming an integral raised portion in an edge section of a floor mat; said floor mat having a pliable multilayer structure having an upper carpet face layer overlying a base layer, and having a main body section bordered by said edge section;*

*molding an integrally molded channel in the edge section and extending longitudinally thereof by placing the base layer and the face layer under a compressive molding pressure applied to a bottom surface of the base layer and the top surface of the carpet face layer;*

*embedding a portion of the bottom surface of the carpet face layer in the upper surface of the base layer such that a pile of the carpet face layer has a substantially uniform height above the upper surface of the base layer across the main body section;*

*heating the base layer to cure the base layer while the face layer and the base layer are under the compressive molding pressure; and*

*maintaining the heating of the base layer until the base layer is cured, so as to form an integral raised portion in the edge section of the floor mat, defined by said integrally molded channel;* wherein said molding step includes forming a relatively thin main body section bordered by a relatively thick edge section.

7. A method according to claim 1, where the base layer is formed of a heat curable elastomeric material.

8. A method according to claim 7 wherein the heat curable elastomeric material is selected from the group consisting of natural rubber, butadiene polymers, butadiene copolymers, isoprene polymers, isoprene copolymers, chloroprene rubbers, nitrile rubbers, butyl rubbers, and ethylene-propylene rubbers and blends and copolymers thereof.

9. A method according to claim 7 wherein the curable elastomeric material is styrene-butadiene rubber.

10. A method of forming an integral raised portion is an edge section of a floor mat; said floor mat having a pliable multilayer structure having an upper face layer of tufted pile carpeting and overlying a base layer of a heat curable elastomeric material and having a relatively thin main body section bordered by a relatively thick edge section; said edge section having an integrally molded channel extending longitudinally thereof and opening from the bottom surface thereof, and having an upper surface disposed at an elevation above the elevation of said main body section of said base layer so as to form an integral raised portion in said edge section, said method comprising:

contacting a top surface of the base layer to a bottom surface of the face layer;

placing the base layer and the face layer under a compressive molding pressure selected from the range of about 50 psi to about 250 psi, where the compressive molding pressure is applied to a bottom surface of the base layer and a top surface of the face layer to mold a channel in and opening from the edge section and extending longitudinally thereof while the base layer and the face layer form a relatively thin main body section bordered by a relatively thick edge section;

embedding a portion of the bottom surface of the face layer in the top surface of the base layer;

heating the base layer to a temperature within the range of about 250° F. to about 400° F. to cure the heat curable elastomeric material of the base layer while the face layer and the base layer are under the compressive molding pressure;

cooling the face layer to a temperature less than about 100° F. to maintain the pile carpeting of the face layer below a temperature at which the carpet pile becomes substantially permanently deformed under the applied molding pressure so as to maintain the resiliency of the carpet pile upon release of the compressive molding pressure, the cooling being conducted simultaneously while the face layer and the base layer are under pressure; and maintaining the heating of the base layer for a period of time selected from the range of about one minute to about twenty minutes until the heat curable elastomeric material of the base layer is cured, so as to form an integral raised portion in the edge section of the floor mat, defined by said integrity molded channel.

11. A method according to claim 10, wherein said molding step includes molding rib members disposed within and extending transversely across the channel.

12. A method according to claim 10 wherein the heat curable elastomeric material is styrene-butadiene rubber.

13. A method of forming an integral raised portion in an edge section of a floor mat wherein said floor mat has a pliable multilayer structure having an upper face layer overlying a base layer wherein said base layer has a main body section bordered by an edge section having an integrally molded channel extending longitudinally thereof and a step portion extending outward from said edge section to the edge of said mat, said method comprising:

molding a step portion extending outward from the edge section and an integrally molded channel in the edge section extending longitudinally thereof by placing the base layer and the face layer under a compressive molding pressure applied to a bottom surface of the base layer and the top surface of the face layer, *the step*

*portion being configured such that, when the mat is in use, the bottom surface of the step portion is substantially coplanar with the bottom surface of the main body section;* embedding a portion of the bottom surface of the face layer in the upper surface of the base layer;

heating the base layer to cure the base layer while the face layer and the base layer are under the compressive molding pressure; and maintaining the heating of the base layer until the base layer is cured, so as to form an integral raised portion in the edge section of the floor mat, defined by said integrally molded channel.

14. A method of forming an integral raised portion in an edge section of a floor mat wherein said floor mat has a pliable multilayer structure having an upper face layer overlying a base layer wherein said base layer has a main body section bordered by the edge section and wherein said edge section has an integrally molded channel extending longitudinally thereof and having a plurality of rib members disposed therein and extending transversely across the channel, said method comprising:

molding an integrally molded channel in the edge section extending longitudinally thereof and a plurality of rib members disposed within the channel and extending transversely across the channel, by placing the base layer and the face layer under a compressive molding pressure applied to a bottom surface of the base layer and the top surface of the face layer;

embedding a portion of the bottom surface of the face layer in the upper surface of the base layer;

heating the base layer to cure the base layer while the face layer and the base layer are under the compressive molding pressure; and maintaining the heating of the base layer until the base layer is cured, so as to form an integral raised portion in the edge section of the floor mat, defined by said integrally molded channel.

*15. A method of forming an integral raised portion in a pliable, multi-layer floor mat having an upper face layer overlying a base layer, said method comprising the steps of:*

*molding an integrally molded channel in the floor mat by placing the base layer and the face layer under a compressive molding pressure applied to a bottom surface of the base layer and the top surface of the face layer;*

*embedding a portion of the bottom surface of the face layer in the upper surface of the base layer;*

*heating the base layer to cure the base layer while the face layer and the base layer are under the compressive molding pressure; and*

*maintaining the heating of the base layer until the base layer is cured, so as to form an integral raised portion in the floor mat, defined by said integrally molded channel;*

*wherein said molding step includes forming a relatively thin main body section bordered by a relatively thick edge section.*

*16. A method according to claim 15 where the face layer is comprised of tufted pile carpeting, said process further comprising the step of crushing the carpet pile while the base layer and the face layer are under compressive molding pressure.*

*17. A method according to claim 15 where the face layer is comprised of tufted pile carpeting, said process further comprising the step of cooling the face layer to maintain the pile carpeting of the face layer below a temperature at which the carpet pile becomes substantially permanently deformed under the applied molding pressure so as to maintain the resiliency of the carpet pile upon release of the compressive molding pressure, the cooling being conducted simultaneously while the face layer and the base layer are under pressure.*

*18. A method according to claim 17 comprising the step of crushing the carpet pile while the base layer and the face layer are under compressive molding pressure.*

*19. A method according to claim 15 wherein said molding step further comprises molding rib members disposed within and extending transversely across the channel.*

*20. A method according to claim 15 where the base layer is formed of a heat curable elastomeric material.*

*21. A method according to claim 20 wherein the heat curable elastomeric material is selected from the group consisting of natural rubber, butadiene polymers, butadiene copolymers, isoprene polymers, isoprene copolymers, chloroprene rubbers, nitrile rubbers, butyl rubbers, and ethylene-propylene rubbers and blends and copolymers thereof.*

*22. A method according to claim 20 wherein the curable elastomeric material is styrene-butadiene rubber.*

*23. An automobile floor mat comprising:*

*a pliable multilayer structure having an upper face layer of carpeting overlying and embedded in a base layer wherein said base layer has a relatively thin main body section bordered by a relatively thick edge section with said upper face layer being coextensive with at least said edge section of said base layer;*

*said edge section having a molded channel extending longitudinally thereof and opening from the bottom surface of said edge section, having an upper surface disposed at an elevation above the elevation of said main body section of said base layer, and providing a decorative edge portion in said upper face layer; and*

*a plurality of rib members integrally molded with, disposed within and extending transversely across said channel.*

*24. An automobile floor mat according to claim 23 wherein each said rib member extends across only a portion of the depth of said channel.*

*25. An automobile floor mat according to claim 23 further comprising a step portion of said pliable multilayer structure extending outward from said edge section to the edge of said mat.*

*26. An automobile floor mat according to claim 25 configured such that, when said mat is in use, the bottom surface of said step portion is substantially coplanar with the bottom surface of the main body section.*

*27. An automobile floor mat according to claim 23 wherein said main body section of said base layer is of sufficient thickness to allow formation of a bottom surface of said main body section of said base layer which differs substantially from the shape of the bottom surface of the main body section of the upper face layer.*

*28. An automobile floor mat according to claim 27 further comprising anchoring means including a plurality of elongate nib elements connected to and projecting downwardly from the bottom surface of said main body section of said base layer.*

*29. An automobile floor mat comprising:*

*a pliable multilayer structure having an upper face layer of carpeting overlying a base layer wherein said base layer has a relatively thin main body section bordered*

*by a relatively thick edge section and a step portion integrally molded with and extending outward from said edge section to the edge of said mat, said edge section having a channel extending longitudinally thereof and opening from the bottom surface of said edge section and having an upper surface disposed at an elevation above the elevation of said main body section of said base layer and providing a decorative edge portion in said upper face layer.*

*30. An automobile floor mat according to claim 29 where, when said mat is in use, the bottom surface of said step portion is substantially coplanar with the bottom surface of the main body section.*

*31. An automobile floor mat according to claim 29 wherein said main body section of said base layer is of sufficient thickness to allow formation of a bottom surface of said main body section of said base layer which differs substantially from the shape of the bottom surface of the main body section of the upper face layer.*

*32. An automobile floor mat according to claim 31 further comprising anchoring means including a plurality of elongate nib elements connected to and projecting downwardly from the bottom surface of said main body section of said base layer.*

*33. A method of forming an integral raised portion in an edge section of a floor mat; said floor mat having a pliable multilayer structure having an upper face layer overlying a base layer, and having a main body section bordered by said edge section;*

*molding an integrally molded channel in the edge section and extending longitudinally thereof by placing the base layer and the face layer under a compressive molding pressure applied to a bottom surface of the base layer and the top surface of the face layer, wherein said molding step includes forming a relatively thin main body section bordered by a relatively thick edge section;*

*embedding a portion of the bottom surface of the face layer in the upper surface of the base layer;*

*heating the base layer to cure the base layer while the face layer and the base layer are under the compressive molding pressure; and*

*maintaining the heating of the base layer until the base layer is cured, so as to form an integral raised portion in the edge section of the floor mat, defined by said integrally molded channel.*

* * * * *